United States Patent [19]

Choi

[11] Patent Number: 5,185,903
[45] Date of Patent: Feb. 16, 1993

[54] ELECTRIC VACUUM CLEANER WITH AN OZONIZER

[75] Inventor: Soo Y. Choi, Suweon, Rep. of Korea

[73] Assignee: Samsung Electronics Co., Ltd., Suweon, Rep. of Korea

[21] Appl. No.: 697,405

[22] Filed: May 9, 1991

[30] Foreign Application Priority Data

May 16, 1990 [KR] Rep. of Korea ............... 90-6546[U]

[51] Int. Cl.$^5$ .............................................. A47L 7/04
[52] U.S. Cl. .................................. 15/339; 15/246.3; 422/186.07
[58] Field of Search ........................... 15/339, 257 B; 422/186.1, 186.15, 186.16, 186.21, 120, 222

[56] References Cited

U.S. PATENT DOCUMENTS

| | | | |
|---|---|---|---|
| 2,242,163 | 5/1941 | Bargeboer | 15/257 B X |
| 2,297,933 | 10/1942 | Yonkers | 15/257 B X |
| 4,485,519 | 12/1984 | Collier | 15/339 X |

Primary Examiner—Chris K. Moore
Attorney, Agent, or Firm—Burns, Doane, Swecker & Mathis

[57] ABSTRACT

An electric vacuum cleaner has an air discharge duct and an ozonizer arranged within the exhaust duct for defining air passages through which the exhaust air is constrained to flow and generating a corona discharge laterally across the air passages. Ozone is thereby generated and mixed with the exhaust air. The voltage which generates the corona discharge is varied in accordance with changes in room temperature in order to minimize changes in the quantity of ozone generated.

6 Claims, 3 Drawing Sheets

ELECTRIC VACUUM CLEANER WITH AN OZONIZER

BACKGROUND OF THE INVENTION

1. Field of The Invention

The present invention relates to an electric vacuum cleaner, more particularly to an electric vacuum cleaner which is provided with an ozonizer in an exhaust duct thereof and a able to purify the exhaust air by the oxidation power of ozone $O_3$ generated by the ozonizer.

2. Description of Prior Art

Conventionally, the hitherto used electric vacuum cleaners have been generally provided with filters mounted ahead of exhaust ducts and adapted for filtering the exhaust air. However, the filters applied to the conventional vacuum cleaners cannot filter off noxious materials and odor, thereby causing them to exhaust along with the filtered exhaust air into the room. Therefore, there has been some problems that the noxious materials and odor exhausted from the conventional vacuum cleaners may be detrimental to a person's health, and possibly the room cleaned by the conventional vacuum cleaners needs to be separately ventilated by opening windows.

Also, there have been proposed vacuum cleaners with an ozonizer for solving the above-mentioned problems by purifying the exhaust air by the oxidation power of ozone generated by the ozonizer. A representative example of the prior art is disclosed in (Pyung) Japanese Laid-Open Utility Model Publication No. 1-76,744 (laid open on May 24, 1989.). The vacuum cleaner disclosed in the above Japanese Utility Model comprises a dust collection cell for collecting dust therein, a dust collection motor for generating a suction power forcing the dust to be sucked into the dust collection cell and an ozonizer for generating the ozone and supplying it to the dust collection cell. Also, this conventional vacuum cleaner is provided with ozone decomposing catalysts for decomposing the residual of the generated ozone.

However, in the conventional electric vacuum cleaner with an ozonizer, it is difficult to obtain enough quantity of ozone to completely purify the exhaust air containing the noxious materials and odor. Also, there is no way to compensate for variations in the generated quantity of the ozone, as caused by variations in room temperature.

SUMMARY OF THE INVENTION

Accordingly, it is an object of the present invention to solve the above-mentioned problems encountered in prior art by providing an electric vacuum cleaner which is provided with an ozonizer in an exhaust duct thereof, and sterilizes and purifies exhaust air by means of ozone generated by the ozonizer, so that the purification efficiency of the cleaner can be promoted.

It is another object of the present invention to provide an ozonizer which is constructed in order to easily generate the corona discharge, thereby causing the ozone to be efficiently generated.

It is still another object of the present invention to provide a power supply means which can vary the pulse voltage applied to the ozonizer in response to variation in the room temperature, thereby causing the quantity variation of the ozone generated by the corona discharge to be compensated for.

In accordance with the present invention, the above-mentioned objects can be accomplished by providing an electric vacuum cleaner with an ozonizer comprising a suction motor, a suction port, an air passage, an exhaust duct, a filter and an ozonizer, and a power supply means. The ozonizer comprises a housing mounted in the exhaust duct, a base adapted for covering an open end of the housing, and provided with a plurality of exhaust holes and a protrusion for engaging with a bolt, a plurality of tips vertically laid with a space therebetween on the protrusion, and having at least two noses, a plurality of spacing members adapted for being located between the tips in order to space the tips, and a bolt member adapted for fixing the tips and said spacing members to the protrusion. The power supply means comprises a power supply circuit adapted for converting a commercial AC voltage into a constant AC voltage, a rectifier circuit adapted for converting the AC voltage from the power supply circuit to a DC voltage, a constant voltage circuit adapted for inputting the DC voltage from the rectifier circuit and outputting a constant DC voltage, a DC voltage regulator circuit adapted for varying the DC output voltage from the constant voltage circuit in accordance with an external temperature, a pulse generator circuit adapted for inputting and amplifying an output voltage from the DC voltage regulator circuit to generate a pulse, and a security circuit adapted for preventing the pulse from the pulse generator circuit from malfunctioning, when the pulse is applied to the ozonizer.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 1:
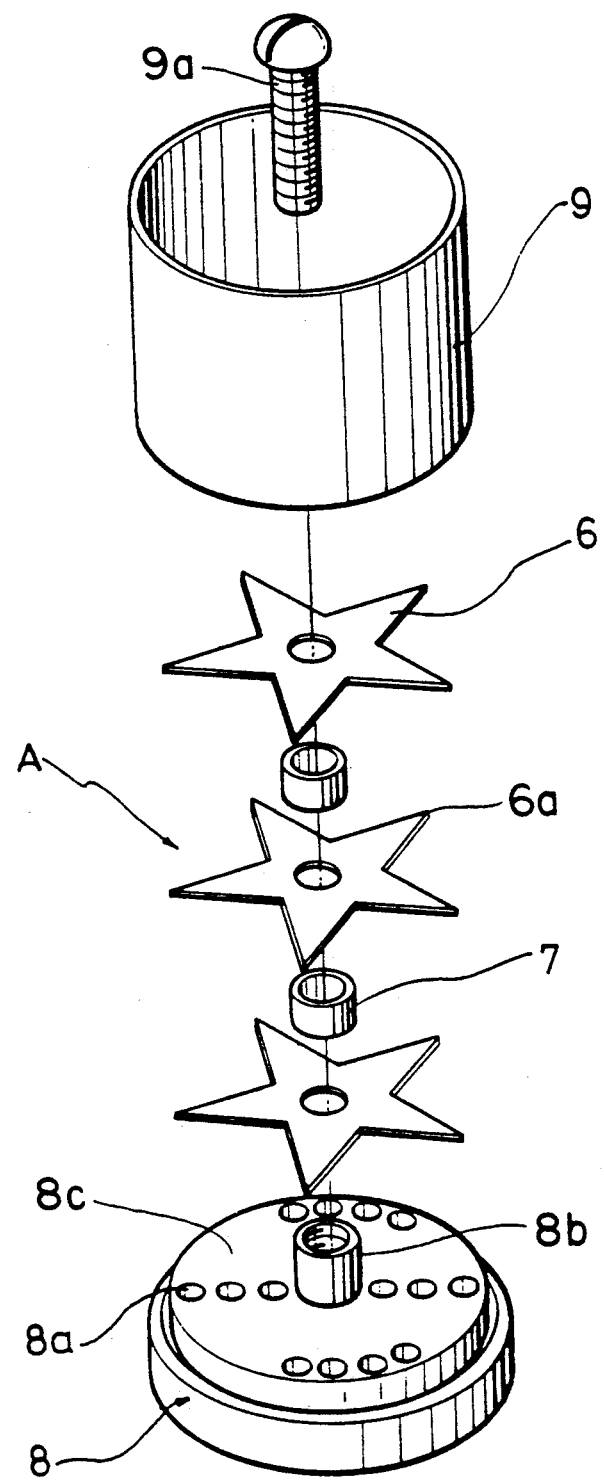
FIG. 1 is an exploded view of an ozonizer for an electric vacuum cleaner in accordance with the present invention.
Figure 2:
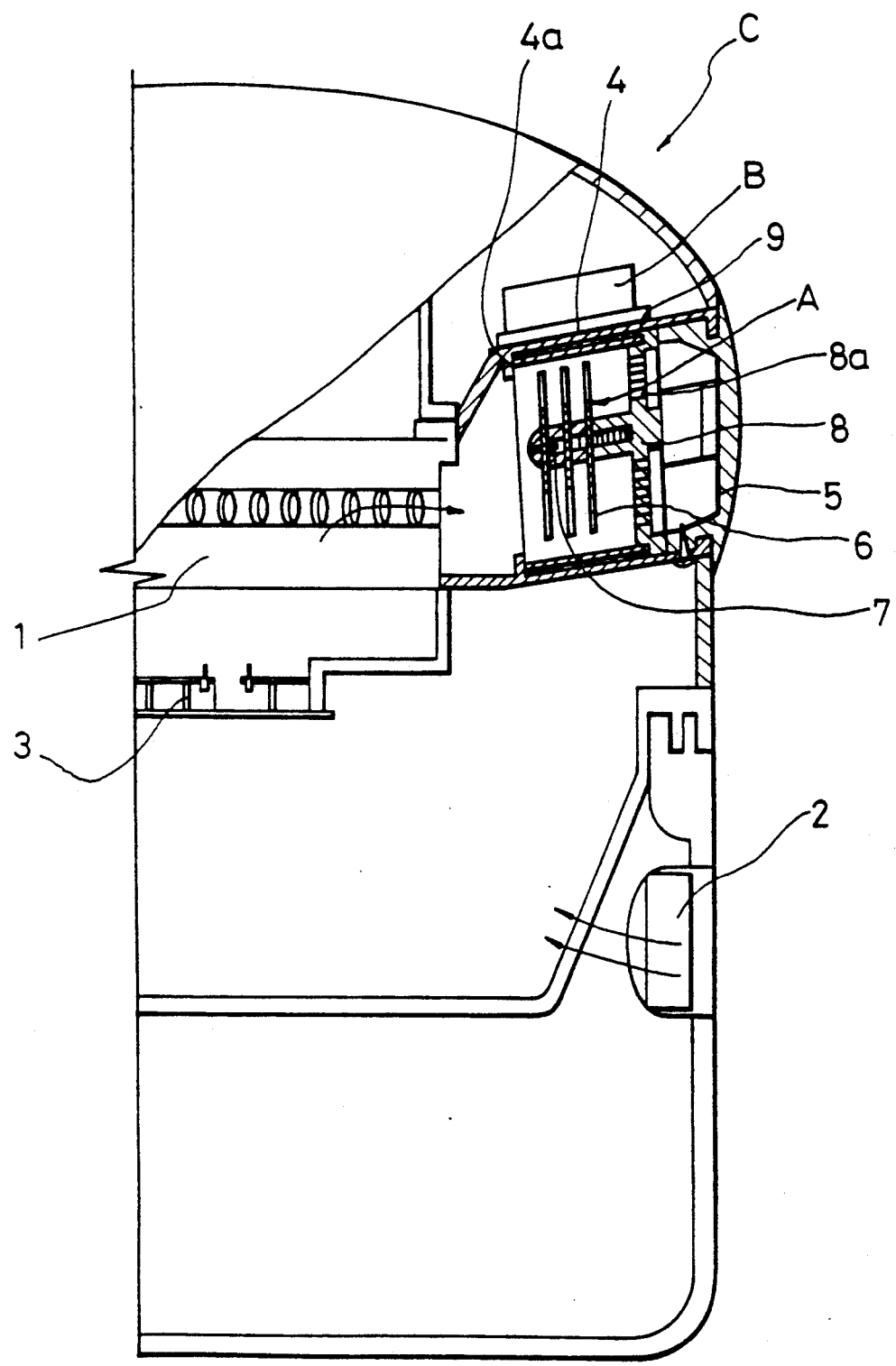
FIG. 2 is a partially sectioned view of an electric vacuum cleaner provided with the ozonizer of FIG. 1.

Referring now to FIGS. 1 and 2 which are respectively an exploded view of an ozonizer in accordance with the present invention and a partially sectioned view of an electric vacuum cleaner provided with the ozonizer, the electric vacuum cleaner with an ozonizer comprises a suction port 2, an air passage 3, an exhaust duct 4, a filter 5 and an ozonizer A mounted in the exhaust duct 4. Thus, the polluted air containing noxious materials, odor and dust is sucked through a suction port 2 by the driving power generated by a suction motor (not shown), then flows to the exhaust duct 4 by way of the air passage 3. Thereafter, the air passes through the filter 5 in order to filter off the noxious materials, dust and the odor therefrom, thereby can be exhausted in a purified state.

As shown in FIG. 1, the ozonizer A mounted in the exhaust duct 4 comprises a base 8, a plurality of star shaped disks 6 each having a center opening, and a plurality of cylindrical spacers 7 respectively located between the star shaped disks 6 in order to space them. A bolt 9a penetrates the center openings of all the star shaped disks 6 and the spacers 7 alternately, and fixes them to the base 8 by screwing into a center hole formed in an upward cylindrical protrusion 8b of the base 8. A cylindrical housing 9 covers the above-mentioned elements. Therefore, the combined elements are located in the center portion inside the cylindrical housing 9. The cylindrical protrusion is made of insulation materials (for example, porcelain materials), and provided with a cylindrical screw conductor which is adapted for engaging with the bolt. Also, the conductor has a terminal which is protruding out of an end of the base and is connected to a power supply circuit, thus high voltage from the power supply circuit is applied to the terminal. Also, the base is provided with a terminal at its bottom, which terminal is connected to the power supply circuit, and a high voltage of an opposite polarity to that of the high voltage applied to the terminal of the conductor is applied to the terminal of the base. Further, this electric vacuum cleaner with an ozonizer is provided with a power supply means B mounted at a position out of the exhaust duct 4.

Figure 3:
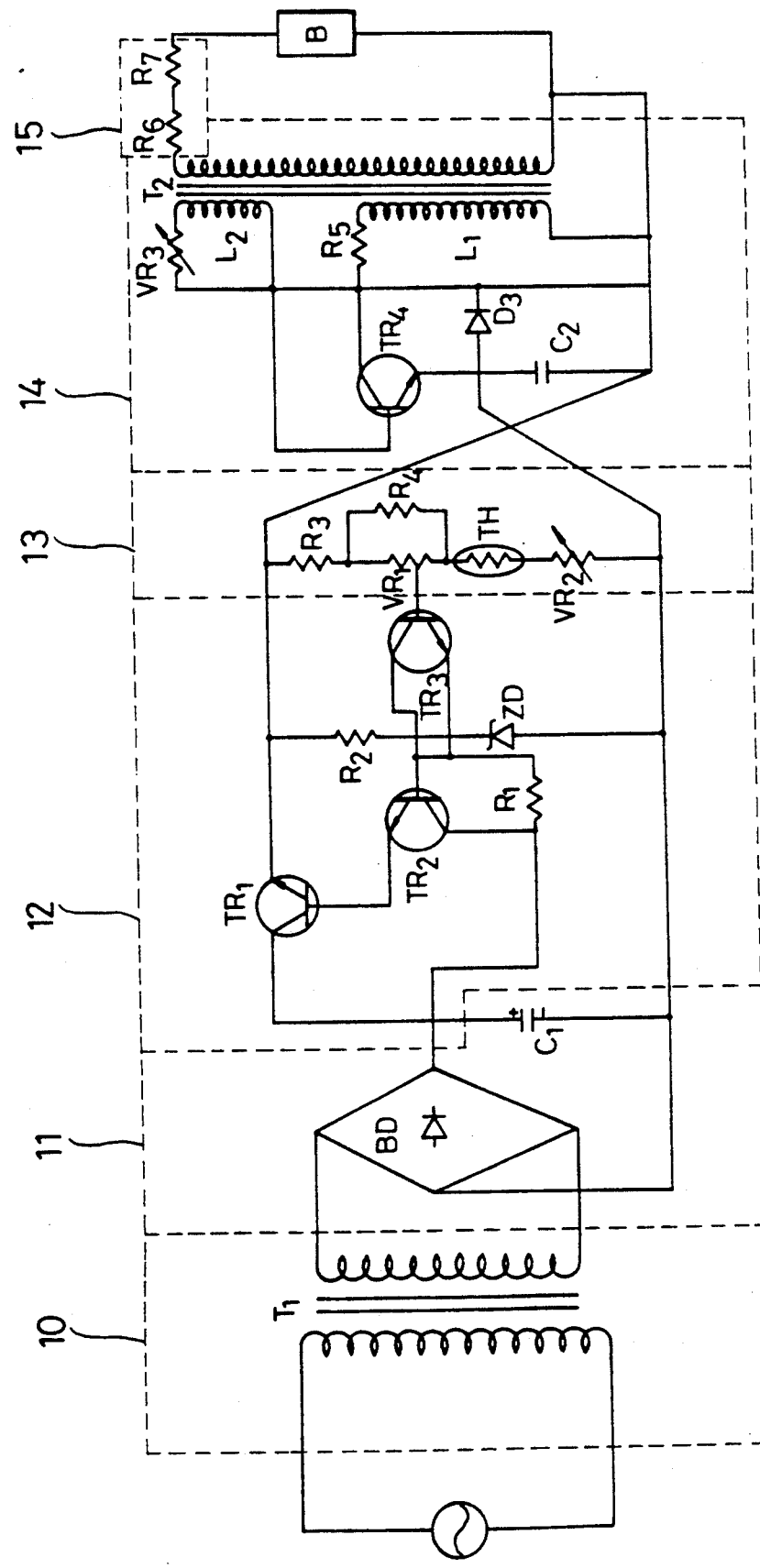
FIG. 3 is a circuit diagram of the circuit for the ozonizer of FIG. 1.

Referring next to FIG. 3, a power supply means in the ozonizer in accordance with the present invention is shown to comprise a power supply circuit 10 for supplying AC power and a rectifier circuit 11 including a bridge rectifier BD and a condenser C1 for rectifying and smoothing the AC power supplied by the power supply 10. Also, the power supply means comprises a constant voltage circuit 12 including a plurality of transistors TR1 to TR3, resistors R1 and R2 and a zener diode ZD, a DC voltage regulator circuit 13 including a thermistor TH, variable resistors VR1 and VR2 and resistors R3 and R4, a pulse generator circuit 14 including a transistor TR4, a resistor R5, a boosting transformer T2, a variable resistor VR3 and a diode D3, and a security circuit 15.

The constant voltage circuit 12 inputs DC voltage from the rectifier circuit 11 to compare the DC voltage with a reference voltage, so that it can output a constant voltage regardless of the variation of power and load. The DC voltage regulator circuit 13 varies the DC output voltage from the constant voltage circuit 12 in accordance with the room temperature. Then, the pulse generator circuit 14 inputs DC voltage stabilized by the DC voltage regulator circuit 13 and amplifies the stabilized DC voltage. On the other hand, when the amplified voltage from the pulse generator circuit 14 is applied to the ozonizer A, the security circuit 15 functions to prevent the circuit devices from malfunctioning due to their breakage.

The above-mentioned electric vacuum cleaner with an ozonizer in accordance with this invention operates as follows.

Upon powering on, the suction motor (not shown) starts to drive, and thereby generates the suction power. Thus, the polluted air containing the dust, noxious materials and odor is sucked into the cleaner through a brush mounted to a free end of a pipe connected to the suction port 2 of the cleaner shown in FIG. 2. Simultaneously commercial power is applied to the power supply means B. Thereby, the ozonizer generates the ozone, and the sucked polluted air moves into the cleaner through the suction port 2. Thereafter, the sucked air passes through a paper bag (not shown) in order to filter off the noxious materials and the dust. Thus, the filtered noxious materials and the dust are collected in the paper bag, while the air containing odor and the residual of the noxious materials flows to the exhaust duct 4 by way of the air passage 3.

Thereafter, the air passes through a plurality of holes 8a formed on the base 8 of the ozonizer A and through a space provided between the inside of the cylindrical housing 9 and the star shaped disks 6 of the ozonizer, and is then filtered by the filter 5, before being exhausted out of the cleaner. At this time, there is a corona discharge in the space between the disks 6 and the cylindrical housing 9, thereby causing a given quantity of ozone to be generated.

In other words, the corona discharge generates the ozone between the disks 6 and the inside of the housing 9. Such procedure is described more precisely with examples as follows.

Referring again to FIG. 1, the cylindrical protrusion mounted to the base 8 is made of insulating materials (for example, porcelain materials), such as a non-conductor. The protrusion is connected to the front wall 8c of the base 8. The cylindrical screw conductor which is adapted to be engaged with the bolt 9a is mounted into the protrusion. The cylindrical conductor is provided with a terminal protruded toward the outside. Also, the negative (−) electrode of the power supply means B is connected to the terminal of the conductor, whereby the disks 6 are electrified with the negative pole, and the housing 9 is electrified with the positive pole. Therefore, as the high voltage is applied to the terminal of the conductor from said power supply means B, the corona discharge occurs between the star shaped disks 6 and the inside of the housing 9.

The ozonizer A according to the present invention includes several star shaped disks or plates 6 which respectively are spaced by prescribed distances by means of the spacers 7. Also, as these star shaped disks 6 respectively have several noses or projections 6, electric charges charged to the noses of the disks 6 are discharged to the cylindrical housing 9. By the discharge, an oxygen molecule $O_2$ among the air is decomposed in order to generate the oxygen O in atom, then an ozone $O_3$ is generated by composing the oxygen atom O and the oxygen molecule $O_2$. The ozone sterilizes dust, bacteria and microorganisms and eliminates odor.

As described above, the electric vacuum cleaner with an ozonizer according to the present invention generates ozone by decomposing and composing the oxygen of the air flowing inside the housing 9. Therefore, while the air flows through the exhaust duct 4, the various noxious materials and odor in the air react with the ozone, thereby are oxidized and sterilized. As a result, this cleaner can exhaust the purified air resulting from elimination of the odor and sterilization of the noxious materials to the room.

On the other hand, residuals of the noxious materials and the odor which avoid reaction with the ozone are completely filtered by the filter 5, and the exhaust air is exhausted to the room in a purified state of no residual ozone.

In the ozonizer circuit means B as shown in FIG. 3, AC power from the power supply circuit 10 is applied to the DC voltage regulator circuit 13 via the rectifier circuit 11 and constant voltage circuit 12, which applies DC voltage to the pulse generator circuit 14.

The thermistor is connected series with the DC voltage regulator, as shown in FIG. 3, to prevent the ozone quantity from varying with room invariations temperature, because otherwise the rate at which ozone is generated would tend to vary as the room temperature varies. On the other hand, voltage applied to the base terminal of the transistor TR3 varies as the room temperature varies. Then, the varying voltage is amplified by the transistor TR3 and applied to the transistor TR2, which varies Vbc in the transistor TR1.

Therefore, the DC voltage regulator circuit 13 varies the voltage to the pulse generator circuit 14 in accordance with the room temperature to compensate for the variation in room temperature. In the pulse generator circuit 14, the constant voltage from the constant voltage circuit 12 is applied to the collector terminal of the transistor TR4 via the primary coil L1 of the boosting transformer T2 and the resistor R5. On the other hand, a tiny current through the diode D3, the variable resistor VR3 and another coil L2 of the transformer T2 is applied to the base terminal of the transistor TR4.

In result, the transistor TR4 turns on, which causes high current to flow through its collector terminal and thus through the primary coil L1 of the boosting transformer T2, thereby resulting in the boosted voltage induced in the secondary coil L3 of the boosting transformer L3. On the other hand, voltage also induced in the primary coil L2 of the boosting transformer T2 is applied as a reverse voltage to the base terminal of the transistor TR4 to turn it off. Also, the tiny current through the variable resistor VR3 and the primary coil L2 of the transformer T2 is applied to the base terminal of the transistor TR4 to repeat its oscillation.

Therefore, the pulse from the pulse generator circuit 14 is applied via the resistors R6 and R7 and the security circuit 15 to the disks 6 and the housing 9 in the ozonizer A to generate the corona discharging between them, which results in the generation of the ozone.

As described above, the electric vacuum cleaner with an ozonizer in accordance with the invention which comprises an ozonizer A mounted in the exhaust duct 4 can provide a significant advantage that various noxious materials and odor in the polluted air sucked into the cleaner by the suction power of the suction motor are reacted with the ozone generated by the ozonizer A in order to be oxidized and decomposed. Thus this cleaner can exhaust the purified air resulting from the elimination of the odor and the sterilization of the noxious materials to the room.

Although the preferred embodiments of the invention have been disclosed for illustrative purpose, those skilled in the art will appropriate that various modifications, additions and substitutions are possible, without departing from the scope and spirit of the invention as disclosed in the accompanying claims.

What is claimed is:

1. An electric vacuum cleaner comprising an air inlet port, a suction motor for inducing a flow of air into said vacuum cleaner through said inlet port, an exhaust duct through which the air flow is exhausted from said vacuum cleaner, and an ozonizer arranged at said exhaust duct for generating ozone and mixing the ozone with the exhaust air, said ozonizer including an outer cylindrical housing, a plurality of plates disposed in said housing, said plates spaced apart in the direction of air flow, each plate including a plurality of circumferentially spaced, radially extending projections forming, together with an inner periphery of said housing, a plurality of air passages, said housing and said plates being electrically conductive, an electrical circuit connected to said housing and plates for establishing a first electrical polarity in said housing and an opposite electrical polarity in said plates, said ozonizer further including a base extending across said exhaust duct, a plurality of through-holes formed in said base for conducting exhaust air, and a bolt extending centrally through said plates and attached to said base, said electrical circuit being connected to said bolt.

2. An electric vacuum cleaner according to claim 1, wherein said circuit means includes means responsive to ambient temperature for varying a voltage applied across the exhaust air flow in accordance with changes in said temperature.

3. An electric vacuum cleaner according to claim 1, wherein said circuit means comprises a power supply circuit for supplying a constant AC voltage; a rectifier circuit for converting said AC voltage from said power supply circuit to a DC voltage; a constant voltage circuit for inputting said DC voltage from said rectifier circuit and outputting a constant DC voltage; a DC voltage regulator circuit for compensating or varying said DC output voltage in accordance with changes in ambient temperature; a pulse generator circuit for inputting and amplifying an output voltage from said DC voltage regulator circuit to generate a pulse; and a security circuit for preventing said pulse from said pulse generator circuit from malfunctioning when said pulse is applied to said ozonizer.

4. An electric vacuum cleaner according to claim 3, wherein said DC voltage regulator includes a thermistor having a resistance which varies with room temperature.

5. An electric vacuum cleaner comprising an inlet port; a suction motor for sucking air into the vacuum cleaner through said inlet port; an exhaust duct for discharging the air; a filter extending across a downstream end of the said exhaust duct; and an ozonizer in said exhaust duct for generating ozone and mixing the ozone with exhaust air flowing through said exhaust duct; said ozonizer comprising a housing disposed in said exhaust duct; a base covering one end of said housing, said base having through-holes therein for conducting exhaust air; a plurality of disks disposed within said housing and spaced apart in the direction of air flow by means of spacers, each disk including at least two projections forming an air passage therebetween; a bolt passing centrally through said disks and mounted in said base; said housing, said bolt, and said disks formed of electrically conductive material; said bolt being electrically connected to said disks; and electrical circuit means for establishing a corona discharge laterally across said air passages as exhaust air flows therethrough; said electrical circuit means being connected to said housing and said bolt and comprising a power supply circuit for converting a commercial AC voltage into a constant AC voltage; a rectifier circuit for converting said AC voltage from said power supply circuit to a DC voltage; a constant voltage circuit for inputting said DC voltage from said rectifier circuit and outputting a constant DC voltage; a DC voltage regulator circuit for varying said DC output voltage in accordance with varying ambient temperature; a pulse generator circuit for inputting and amplifying an output voltage from said DC voltage regulator circuit to generate a pulse; and a security circuit for preventing said pulse from said pulse generator circuit from malfunctioning when said pulse is applied to said ozonizer.

6. An electric vacuum cleaner according to claim 5, wherein said DC voltage regulator comprises a thermistor having a resistance which varies with variations in ambient temperature.

* * * * *